United States Patent
Chen

(10) Patent No.: US 12,470,892 B2
(45) Date of Patent: Nov. 11, 2025

(54) EXTENDED REALITY LOCALIZATION

(71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 64 days.

(21) Appl. No.: 16/856,720

(22) Filed: Apr. 23, 2020

(65) Prior Publication Data

US 2021/0333863 A1 Oct. 28, 2021

(51) Int. Cl.

| | |
|---|---|
| *G06F 3/01* | (2006.01) |
| *G06F 16/587* | (2019.01) |
| *G06F 16/9537* | (2019.01) |
| *G06K 9/00* | (2022.01) |
| *G06K 9/20* | (2006.01) |
| *G06V 40/16* | (2022.01) |
| *G06V 40/70* | (2022.01) |
| *H04W 4/029* | (2018.01) |
| *G06V 10/10* | (2022.01) |
| *G06V 40/10* | (2022.01) |

(52) U.S. Cl.
CPC ............. *H04W 4/029* (2018.02); *G06F 3/011* (2013.01); *G06F 16/587* (2019.01); *G06F 16/9537* (2019.01); *G06V 40/172* (2022.01); *G06V 40/70* (2022.01); *G06V 10/17* (2022.01); *G06V 40/103* (2022.01); *G06V 40/16* (2022.01)

(58) Field of Classification Search
CPC ............................ G06F 3/011; H04W 4/029
See application file for complete search history.

(56) References Cited

U.S. PATENT DOCUMENTS

| | | | |
|---|---|---|---|
| 9,264,479 B2 * | 2/2016 | Mullins | G06F 3/011 |
| 9,538,332 B1 * | 1/2017 | Mendelson | H04W 48/10 |
| 9,851,783 B2 | 12/2017 | Allen | |
| 9,865,091 B2 | 1/2018 | Giraldi et al. | |
| 11,089,427 B1 * | 8/2021 | Canberk | H04S 7/304 |
| 2010/0257252 A1 | 10/2010 | Dougherty et al. | |
| 2013/0293530 A1 * | 11/2013 | Perez | G06Q 30/0251 |
| | | | 345/418 |
| 2014/0324615 A1 * | 10/2014 | Kulkarni | G06Q 30/0601 |
| | | | 705/26.1 |
| 2016/0191772 A1 | 6/2016 | Jordan | |

(Continued)

OTHER PUBLICATIONS

R. B. Rusu and S. Cousins, "3D is here: Point Cloud Library (PCL)," 2011 IEEE International Conference on Robotics and Automation, Shanghai, 2011, pp. 1-4, doi: 10.1109/ICRA.2011.5980567.

*Primary Examiner* — Lixi C Simpson
(74) *Attorney, Agent, or Firm* — Banner & Witcoff, Ltd.

(57) ABSTRACT

Systems, apparatuses, and methods are described for relocalizing a mobile device within an extended reality environment. A subset of a data set, such as a feature pointcloud may be generated based on determining an approximate location of a mobile device. The approximate location may be determined based on data received from one or more sensors in the extended reality environment. Features associated with the approximate location may be included in the subset while other features may be removed. Features extracted from an image taken by the mobile device may be compared with the subset of the data set to relocalize the mobile device.

22 Claims, 8 Drawing Sheets

(56) References Cited

U.S. PATENT DOCUMENTS

| | | | |
|---|---|---|---|
| 2016/0192209 A1* | 6/2016 | Rumreich | H04W 16/28 |
| | | | 455/562.1 |
| 2016/0217615 A1* | 7/2016 | Kraver | G09G 5/003 |
| 2017/0357296 A1 | 12/2017 | Jordan | |
| 2018/0067187 A1* | 3/2018 | Oh | G01S 1/024 |
| 2018/0095542 A1* | 4/2018 | Mallinson | G06T 19/006 |
| 2018/0139570 A1* | 5/2018 | Calvarese | H04W 4/021 |
| 2018/0348338 A1* | 12/2018 | Li | G01C 21/206 |
| 2019/0037134 A1* | 1/2019 | Merati | G06T 11/60 |
| 2019/0094919 A1 | 3/2019 | Jordan | |
| 2019/0122443 A1 | 4/2019 | Stocker | |
| 2019/0174170 A1 | 6/2019 | Chen | |
| 2020/0005040 A1* | 1/2020 | Ur | G06F 3/011 |
| 2020/0351486 A1* | 11/2020 | Chapman | H04B 10/1141 |
| 2020/0400327 A1* | 12/2020 | Thumati | F24F 11/49 |
| 2021/0110557 A1* | 4/2021 | Busey | G06N 3/08 |

* cited by examiner

EXTENDED REALITY LOCALIZATION

BACKGROUND

Extended reality (XR) experiences, such as augmented reality (AR), virtual reality (VR), and mixed reality (MR) experiences, may provide users with an immersive simulated experience that is at least partially based on the real-world. A VR experience may comprise an entirely simulated environment, e.g., a simulation of a park bench, but some aspects of the real-world may have an effect on the simulation (e.g., a real-world shape of a box next to the user may appear as a simulated computer terminal in the VR experience). An AR experience may provide a partially-simulated environment that combines virtual objects (e.g., a virtual park bench) with real-world images such as an image from a camera or seen through a transparent display; and an MR experience may resemble an AR experience, but may allow users to interact with virtual objects, e.g., a user may use a virtual hand to grab a virtual bottle from a virtual park bench that has been overlaid atop a real-world image of the user's environment. The digital overlay in one or more of the above extended reality systems is generally based on localizing a user device, e.g., determining accurate position and/or orientation of the user device. As the user moves about in the environment and/or moves their head, the extended reality system may need to relocalize the user (e.g., updating the position and/or the orientation), and this process may be computationally challenging.

SUMMARY

The following summary presents a simplified summary of certain features. The summary is not an extensive overview and is not intended to identify key or critical elements.

Systems, apparatuses, and methods are described for determining updated position, location, and/or orientation (e.g., relocalizing) of a mobile device in an extended reality environment. The relocalization process may generally comprise receiving an image captured by a camera associated with the mobile device, and comparing that image with a data set (e.g., a feature pointcloud) representing a known environment, to find matching features. A matching feature can then be used to determine the location and orientation of the mobile device's camera. To reduce the computational complexity of this comparison, data from other sensors (e.g., security cameras, motion detectors, etc.) may be used to reduce the amount of the known environment that must be compared with the captured image to find the match. For example, a security system camera may be used to determine that the only people in a house are in the family room, so in performing the relocalization process using an image from the mobile device, the system may focus its efforts on the family room, and need not bother with looking for matches in other rooms such as the kitchen, bedrooms, etc.

Data from multiple sensors may be used to hierarchically generate a smaller subset of the data set for comparison and/or for verification of an established approximate location of the mobile device. For example, a camera's data may be used to generate a subset of the data set comprising features within a field of view of a camera observing a humanoid shape. An infrared sensor may detect heat generated by the mobile device to further refine the approximate location, which may be used to further reduce the size of the subset of the data set. Alternatively or in addition, the infrared sensor data may be used to further verify that the established approximate location is correct.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
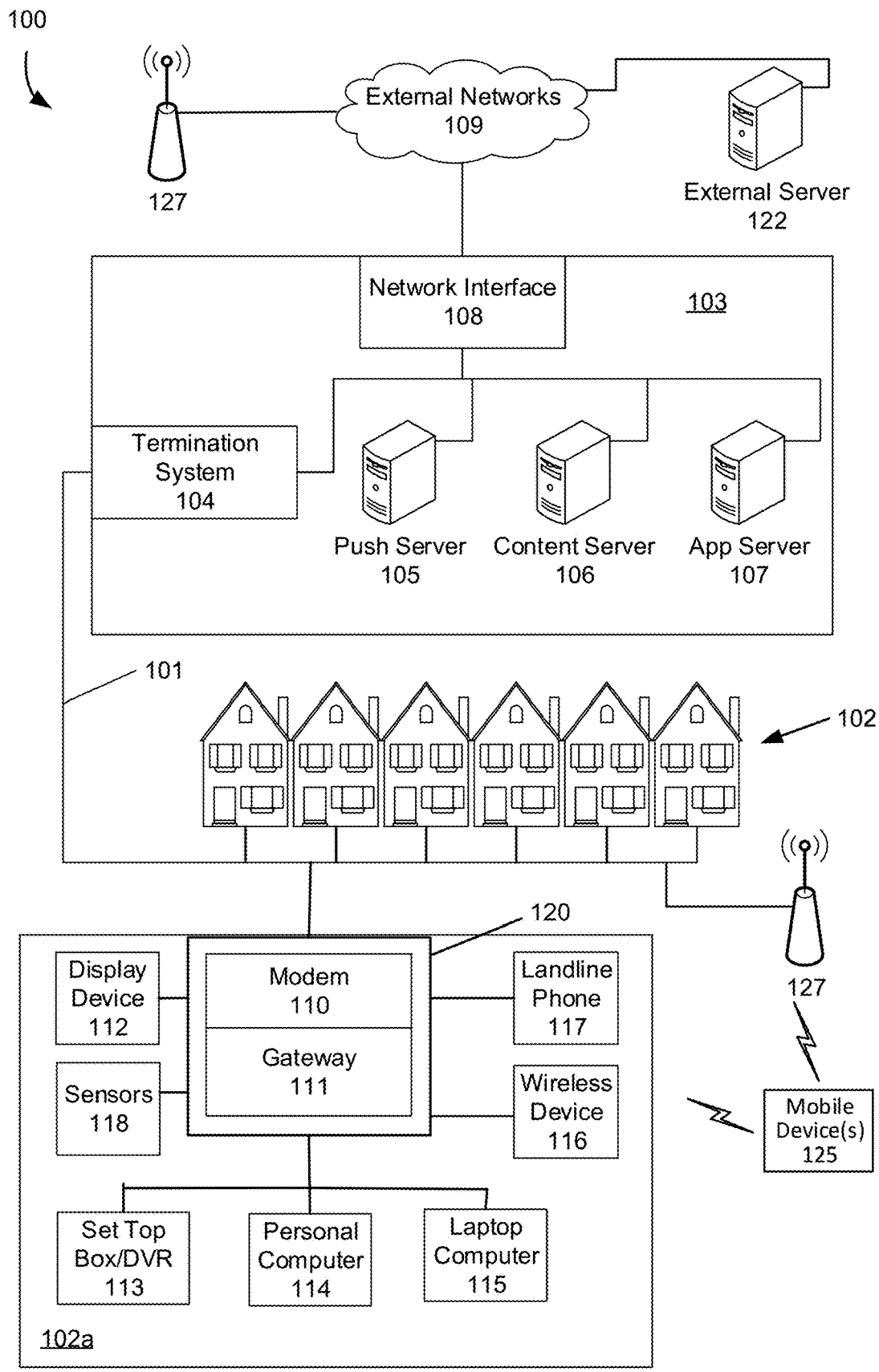
FIG. 1 shows an example communication network that may employ some or all of the features described herein.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices such as extended reality (XR) devices (e.g., augmented reality (AR) devices, virtual reality (VR) devices, and/or mixed reality (MR) devices), and/or any other type of device configured to communicate via a wireless network. It should be understood that smartphones, tablets, and laptop computers may also function as one or more of the XR devices.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communication links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the network interface 108 and one or more of the external networks 109, for example, via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. An application server may be responsible for monitoring user viewing habits and collecting information from that monitoring for use in selecting advertisements. Another application server may be responsible for formatting and inserting advertisements in a video stream being transmitted to devices in the premises 102 and/or to the mobile devices 125. Yet another application server may provide XR services, experiences, games, media, and/or related object coordinates data to user XR devices. The local office 103 may comprise additional servers, such as additional push, content, and/or application servers, and/or other types of servers. Although shown separately, the push server 105, the content server 106, the application server 107, and/or other servers, may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110 to communicate via the communication links 101. The modem 110 may comprise, for example, a coaxial cable modem (for coaxial cable lines of the communication links 101), a fiber interface node (for fiber optic lines of the communication links 101), a twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), digital transport adapter (DTA), computer server, and/or any other desired computing device.

The gateway 111 may also comprise one or more local network interfaces to communicate, via one or more local networks, with devices in the premises 102a. Such devices may comprise, for example, display devices 112 (e.g., televisions), STBs or DVRs 113, personal computers 114, laptop computers 115, enhanced viewing devices, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), sensors 118 and any other devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The sensors 118 may include any type of sensing, measuring, and/or surveillance devices. The sensors 118 may be wired or wireless, and may be configured to measure and/or sense a corresponding parameter in the premise 102a. For example, the sensors may comprise video cameras, motion detectors, infrared sensors, microphones, thermometers, wind sensors, electromagnetic field sensors, antennas, wireless communications equipment, and/or any other type of sensors. The antennas of the gateway 111 may also be considered as signal sensors. The sensors 118 may be managed by the external server 122. The application server 107 may access sensor data from the external server 122 or through the sensors directly. The application server 107 may utilize the sensor data to generate a subset of a data set, such as a feature pointcloud, to relocalize the mobile device 125 within the premise 102a during an XR/session.

Figure 2:
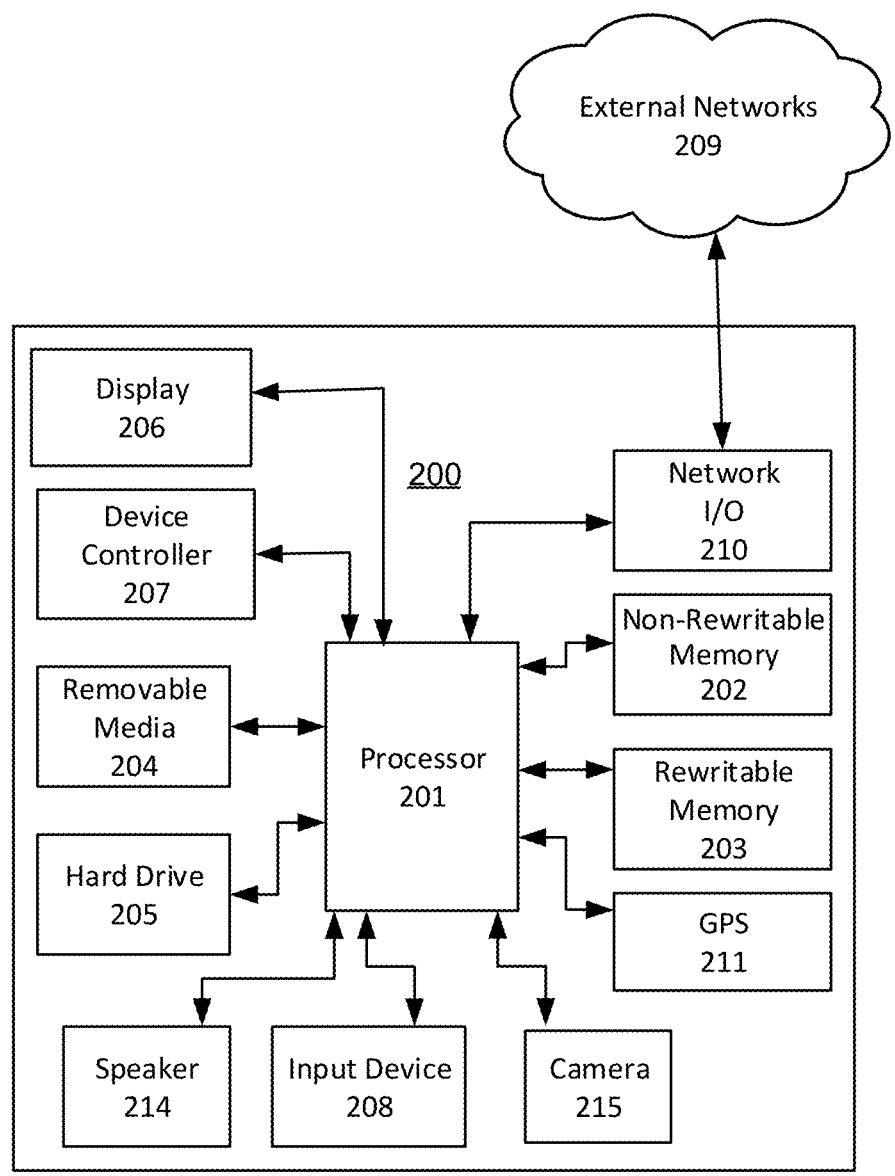
FIG. 2 shows an example computing device that may be used to implement the various elements described herein.

FIG. 2 shows hardware elements of a computing device 200 that may be used to implement any of the devices in FIG. 1. (e.g., the application server 107 and the mobile device 125). The computing device 200 may comprise one or more processors 201, which may execute instructions of a computer program to perform any of the features described herein. The instructions may be stored in a non-rewritable memory 202 such as a read-only memory (ROM), a rewritable memory 203 such as a random access memory (RAM) and/or flash memory, removable media 204 (e.g., a USB drive, a compact disc (CD), a digital versatile disc (DVD)), and/or in any other type of non-transitory computer-readable storage medium or memory. Instructions may also be stored in an attached (or internal) hard drive 205 or other type of storage media. The computing device 200 may comprise one or more output devices, such as a display 206 and a speaker 214, and may comprise one or more device controllers 207, such as a video processor or a controller for an infra-red or BLUETOOTH transceiver. One or more user input devices 208 may comprise a remote control, a keyboard, a mouse, a touch screen (which may be integrated with the display 206), a microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a GPS microprocessor 211, which may be configured to receive and process global positioning signals and determine, with possible assistance from an external server and antenna, a geographic position of the computing device 200.

The computing device 200 may provide an XR experience to a user. The display 206 may render a digital overlay of virtual objects on the real world being observed by the device. The computing device 200 may be handheld (e.g., a smartphone), wherein the display 206 facing the user may render virtual objects on a real world scene being captured by a camera. The computing device may be body worn (e.g., a headset), and the display 206 may be incorporated as a see-through display for the user to see the virtual objects and the real world simultaneously. A camera 215 in the computing device 200 may capture images of the real world environment surrounding the user. The computing device may extract features from the images and digitally overlay virtual objects in the captured images.

The computing device 200 may comprise positioning and motion tracking sensors, for example, gyroscopes, accelerometers, structured light systems, and the like. The computing device 200 may track head motion using motion tracking sensors, for example. A gyroscope may comprise an electronic, microchip-packaged microelectromechanical systems (MEMS) gyroscope. The accelerometers may be used to measure acceleration of the computing device 200. The computing device 200 may use the accelerometers to maintain user interface control, such as controlling the orientation of an AR being displayed on the computing device 200. The computing device 200 may use the structured light systems to determine a depth of objects displayed in the display 206.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
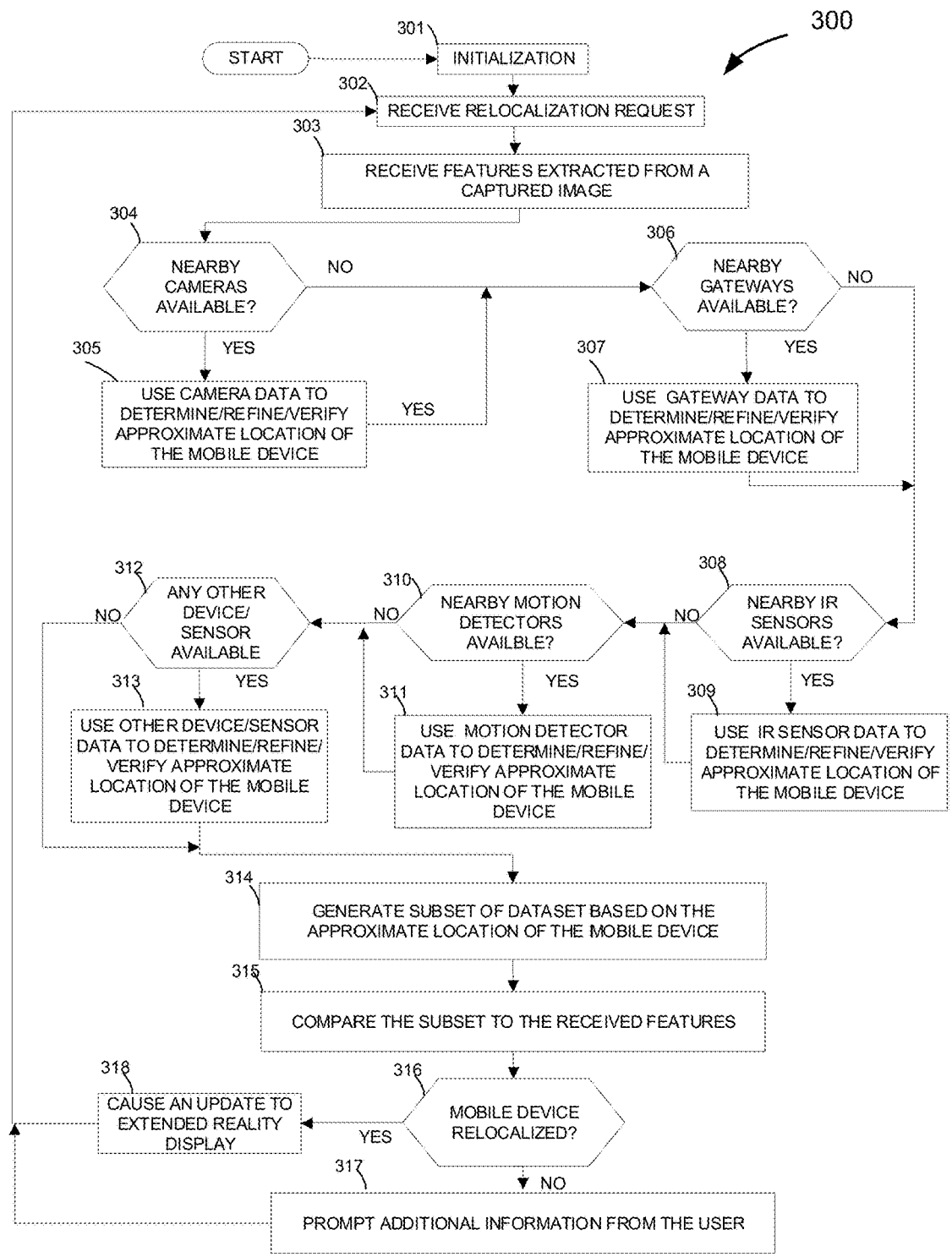
FIG. 3 shows a flow chart of an example method of relocalizing a mobile device.

FIG. 3 is a flow chart showing an example method 300 for localizing and/or relocalizing (e.g., determining and/or updating position and orientation) a mobile device (e.g., an XR headset having integrated cameras). The steps of the method 300 may be performed by a server such as the application server 107 and a mobile device 125, as shown in FIG. 1. The server 107 and the mobile device 125 are just example computing devices that may perform the steps of the method 300, and any type or configuration of computing devices should be considered within the scope of this disclosure. The server 107 that performs the method 300 may provide XR services to the mobile device 125. More particularly, the server 107 may perform the method 300 to determine and update locations (e.g., position and orientation) of the mobile device 125 such that virtual objects are digitally overlaid at appropriate positions and orientations within a view of the real world from the mobile device 125.

The XR services provided by the server 107 to the mobile device 125 may allow the mobile device 125 to display and XR environment. The XR environment may comprise, for example, an AR environment, a VR environment, or an MR environment. A VR environment may comprise an entirely simulated environment, e.g., a user seeing a 360 view of a museum room in a headset (an example of the mobile device 125). An AR environment may comprise a partially-simulated environment that combines virtual objects (e.g., a virtual furniture) with real-world images captured by the mobile device 125. An MR environment may resemble an AR environment, but may allow users to interact with virtual objects, e.g., using a virtual hand to grab a virtual object from the virtual furniture.

In step 301, the computing device(s) operating the XR experience may be initialized. The initialization may comprise the server 107 loading a server side XR application and establishing a connection with the mobile device 125. An XR application in the mobile device 125 may connect with the server side XR application and indicate that an XR session is being started in the mobile device 125. The server 107 may authenticate the mobile device 125 and start server side operations of the XR session. At the beginning of the XR session, the server 107 may instruct a user of the mobile device 125 to perform one or more test operations such that the camera and display of the mobile device 125 are functioning correctly. The known environment (e.g., a venue such as the user's home) of the mobile device 125 may be determined based upon information such as GPS coordinates received from the mobile device 125. Alternatively or in addition, the user may be prompted to enter the location of the mobile device 125 (e.g., street address, business name, selection from list of previously-used locations, etc.) and the known environment may be determined based upon the entry to the prompt. The user may also indicate that he/she is at "home," "work," "airport," "favorite restaurant," and/or any other type identifier that may allow the server 107 to determine the known environment of the mobile device 125. A data set, such as a feature pointcloud, associated with the known environment, may be selected. The known environment may have various features (e.g., walls, furniture, stairs, etc.), and the data set may comprise 3D coordinate data indicating the locations of these features. The data set may comprise coordinates relative to a predetermined location (e.g., an origin at the northwest corner of the house's ground floor), and the coordinates may indicate precise locations of the surfaces of the features. The data set may contain accurate coordinate data for vertical surfaces (indicating walls), horizontal surfaces (indicating floor, ceiling, table tops), corners, oblique surfaces, textures (e.g., wall paper, carpet), and/or any other type of features. The features may further include objects such as windows, doors, three-dimensional objects (e.g., furniture) within the known environment. The data set may also indicate characteristics of features, as well as their location. For example, the data set may indicate color of a feature, transparency of a feature, texture pattern, surface type (e.g., metal, porcelain, rubber, cloth, etc.), temperature, and/or any other desired characteristic that may be used to replicate the known environment.

It should be understood that the feature pointcloud is merely an example of the data set that may be used to localize and/or to relocalize the mobile device 125. Any kind of data set may be used for the examples of localization and/or relocalization described herein.

Communication connections may be established with one or more sensors within the known environment in the vicinity of the mobile device 125. For example, the server 107 may have stored, in a database, identifiers of sensors available at the "work" location for the user. After the server 107 has determined that the user is at work (an example of a known environment for the user), the server 107 may communicate with the sensors at the work location. The sensors may include, for example, surveillance cameras, infrared light receivers and/or cameras, motion detectors, sensors on Internet of things (IoT) devices, and/or any other type of sensors. These sensors may be connected to a network (e.g., a wide-area network, WAN, such as the Internet) through wired or wireless connections, and the server 107 may use Internet Protocol (IP)-based communication to connect to the sensors. These connections may allow the server 107 to receive data from the sensors and to provide instructions to the sensors. One or more sensors may be maintained by back-end servers (e.g., external server 122 in FIG. 1), and the server 107 may connect to the corresponding back-end servers to communicate with the sensors.

In step 302, a relocalization request may be received. Although this step and subsequent steps refer to "relocalization" for updating the position and orientation of the mobile device, some or all of these steps are applicable to an initial localization process as well. The mobile device 125 may transmit the relocalization request when the mobile device 125 may have difficulty determining its own position and orientation with respect to a frame of reference, and/or on a continuous basis throughout a duration of an XR experience (e.g., if the mobile device 125 simply lets the server 107 handle all relocalization calculations). The frame of reference may be any kind of coordinate system that is being used within the known environment. For example, the data set may comprise multiple features, as a feature pointcloud, with locations based upon a particular point designated as an origin within the known environment. For example, the northernmost, westernmost corner on the ground floor of the home may be established as the origin (coordinates (0,0,0) of a Cartesian coordinate system) used to represent the locations of all other features in the home. Any kind of referencing system for establishing locations of real and virtual features within the known environment should be considered within the scope of this disclosure. The mobile device 125 may be able to relocalize itself using one or more sensors (e.g., gyroscopes, inertial sensors) within the mobile device. If the local calculations based upon the measurements of the mobile device 125 are insufficient for relocalization, the mobile device 125 may transmit the relocalization request to the server 107.

In step 303, a current image (and/or information identifying features in the current image), captured by a camera of the mobile device 107, may be received, and may be processed to identify features in the image (e.g., walls, corners, surfaces, etc.). The features may be received with the relocalization request itself. Alternatively, the mobile device 125 may transmit the features in the image after the server 107 acknowledges that the relocalization request of step 302 has been successfully received. In case of the mobile device 125 being a smartphone, the image may show what the user is looking at on the display of the smartphone. In case of the mobile device 125 being a headset with a pass-through glass, the image may show what the user is looking through the pass-through glass.

The features from the image may be determined (e.g., detected or recognized) locally by the mobile device 125. For instance, the mobile device 125 may convert a color image to grayscale format, and recognize features from the grayscale format. The features may include, but are not limited to, vertical surfaces, horizontal surfaces, oblique surfaces, edges, blobs, lines, texture, and/or any other features. The feature may include more complex structures such as furniture, door, windows, boxes, and/or any other features identified by the mobile device 125. The mobile device 125 may transmit information identifying these features (e.g., coordinates, feature types, orientation, etc.) to the server 107 in association with the relocalization request. The feature determination can be performed locally at the client side (e.g., by the mobile device 125), at the server side, and/or at both the client side and the server side. For example, detection of relatively simple features (e.g., edges, spheres, corners, etc.) may be performed by the mobile device 125, and detection of relatively complex features (e.g., complex shapes with combination of different edges, faces, etc.) may be performed by the server 107. Any combination of feature determination shared between the mobile device 125 and the server 107 should be considered within the scope of this disclosure.

To relocalize the mobile device 125, the server 107 may compare the received/determined features with a data set of the known environment, and the location/orientation of the mobile device 125 may be determined based on how the matching feature, from the known environment, appears in the captured image (e.g., if a vertical wall in the known environment appears at an angle in the image, then the server can determine that the mobile device was tilted at an angle when it captured the image). However, a comparison involving the entire data set may be computationally expensive. The relocalization algorithm may determine if additional information is available to reduce the size of the data set to be used in the comparison, and generate a smaller subset of the data set for comparison. The additional information need not necessarily be available to the mobile device 125 itself but may be available to the server 107. For example, the server 107 may connect to one or more sensors in the vicinity of the mobile device 125, and the data from the one or more sensors need not necessarily available to the mobile device 125.

The data received from the one or more sensors may help the server 107 to determine an approximate location of the mobile device 125. For example, the sensors may be tracking the mobile device 125 and/or the user within the known environment, and this tracking data may be utilized to determine that the mobile device 125 is in a family room of a home. The server 107 may use the approximate location to generate the subset of the data set (e.g., the pointcloud data for the family room), wherein the subset may comprise features in the vicinity of the approximate location. The server 107 may generate the subset of the data set by eliminating (or removing) features that are not in the vicinity of the approximate location, and can also be used to eliminate portions of the pointcloud (e.g., if a security camera confirms that nobody is in the kitchen, then the pointcloud data of the kitchen need not be used in finding a match with the captured image from the mobile device). Steps 304-314 described below disclose determining an approximate location of the mobile device based upon data from one or more sensors and generating the smaller comparison set based on the approximate location of the mobile device 125, but this is merely an example, and the determination may be made elsewhere in the system (e.g., the mobile device 125, another computing device, etc.).

In step 304, a determination may be made as to whether one or more other cameras are available in association with the known environment. The server 107 may have determined in the initialization step that a plurality of surveillance cameras are installed in the home in which the XR experience is being provided. The surveillance cameras may observe the user and/or the mobile device 125, and the server 107 may use the data from the surveillance cameras to establish an approximate location of the mobile device 125. The server 107 may communicate with each of the surveillance cameras, for example, by directly pinging the surveillance cameras and/or causing back-end servers maintaining the surveillance cameras to ping the surveillance cameras. One or more surveillance cameras, either directly or through the back-end server may respond with corresponding acknowledgement messages. If the server 107 determines that one or more nearby surveillance cameras are available, the server may execute step 305. If the server 107 determines that one or more nearby surveillance cameras are not available, the server 107 may execute step 306 without executing step 305.

In step 305, surveillance camera data may be used to determine, refine, and/or verify an approximate location of the mobile device. Data may be received from the one or more surveillance cameras within the known environment of the mobile device 125. The one or more surveillance cameras may be observing multiple areas within the known environment. In a home, for example, multiple surveillance cameras may be observing multiple areas such as the front door, living room, and/or the hallway. The corresponding image data from these surveillance cameras may be retrieved. The image data may be a video feed from the surveillance cameras and the server 107 (or another device) may perform additional processing to detect objects in the video feed that may correspond to the user and/or the mobile device 125. The server 107 may determine, implementing any object recognition algorithm, whether one or more surveillance cameras has observed objects that may be the user and/or the mobile device 125. Based on this detection, the server 107 may determine one or more approximate locations of the user and/or the mobile device. In the example of the home, a surveillance camera image may comprise a human being or a humanoid object in an image of the living room, whereas images from surveillance cameras in other rooms may lack any image of a human being or mobile device. From this, the server may determine the approximate location of the mobile device 125, or user, to be in the living room.

Other actions may also be caused, to assist in the determination of whether the user or mobile device is captured in a surveillance camera image. For example, the server 107 may instruct the mobile device 125 to turn on and/or flash a light emitting diode (LED), which may be more easily observed by one or more of the surveillance cameras. The LED may emit light that may be more easily detected by a camera, such as infrared light for an infrared surveillance camera. The source of the light as detected from the surveillance camera data may be the approximate location of the mobile device 125. If there are multiple mobile devices/users in multiple rooms, the active observed behavior of the mobile device may allow the server 107 to determine the location of the mobile device 125.

In the case of body worn devices such as an XR headset, image recognition technology may be used to determine the approximate location of the body worn device. For example, if the user is wearing an XR headset, a face recognition algorithm (regardless of where it is implemented) may fail because the XR headset may block significant areas of the face. However, a body detection algorithm (regardless of where it is implemented) may still succeed because the body is not significantly blocked by the XR headset. An approximate location of XR headset may be determined based on a mismatch between face recognition and body recognition (e.g., a human body being detected while a face not being detected). The XR headset may also include active emitters that may interfere with image capture. The server 107 may detect the interference (e.g., distortion) in the surveillance camera data and determine the location of the source of interference, which may be established as the approximate location of the mobile device 125.

The user may be prompted to perform a physical action to make the user easier to detect in the surveillance image. For example, the server 107 may transmit the message to the mobile device 125 prompting the user to raise their hand and/or to perform any other physical action. The server 107 may detect this physical action in the surveillance camera feed and determine the approximate location of the mobile device 125 based on the surveillance camera that provided the image showing the raised hand.

Another way of approximating the location may use the wireless communications of a gateway 111 and the mobile device 125. In step 306, a determination may be made if there are one or more gateways 111 are available within the known environment of the mobile device 125. A gateway may be, for example, a Wi-Fi router connecting the mobile device with a WAN such as the Internet. The gateway may connect to the mobile device 125 and/or observe signals from the mobile device. The server 107 may use the connection data and/or the observation data (collectively referred to as gateway data) from the gateway to establish an approximate location of the mobile device 125. If the server 107 determines that one or more nearby gateways are available, the server may execute step 307. If the server 107 determines that one or more nearby gateways are not available, the server 107 may execute step 308 without executing step 307.

In step 307, gateway data may be used to determine, refine, and/or verify the approximate location of the mobile device 125. The approximate location of the mobile device 125 may be determined based on determining which gateway 111 the mobile device 125 is connected to. For example, the user's work location may have multiple gateways such as a Wi-Fi router (or a relay extension) for each floor in an office building. The mobile device 125 may be connected to one gateway out of the multiple gateways. The server 107 may have received the relocalization request from the gateway that the mobile device 125 is connected to. The server

107 may determine the approximate location of the mobile device 125 based on the location of the gateway device the relocalization request came from. For example, if the request came via the router on the $1^{st}$ floor of a building, and not from another router on the $2^{nd}$ floor of the building, then the server 107 may eliminate the $2^{nd}$ floor and/or determine the $1^{st}$ floor to be the approximate location (or part thereof).

Directionality of the signals from the mobile device 125 as received by a gateway 111 may be used to determine the approximate location. The gateway 111 may comprise antenna arrays, and the antenna arrays may determine the direction from which the signals from the mobile device 125 arrive at the gateway 111. This directionality may be determined by using any desired beamforming methods. The server 107 may retrieve this directionality data to determine the approximate location. For instance, the signals may be coming from east of the gateway, and the server 107 may determine the approximate location of the mobile device 125 to be the east of the gateway.

Another way of approximating the location may use infrared (IR) sensors. In step 308, a determination may be made as to whether one or more nearby IR sensors are available. The IR sensors may detect heat generated by the mobile device 125, and the server 107 may use the detection data to establish an approximate location of the mobile device 125. If the server 107 determines that one or more IR sensors are available in the environment, the server may execute step 309. If one or more IR sensors are not available, the server 107 may execute step 310 without executing step 309.

In step 309, IR sensor data may be used to determine, refine, and/or verify the approximate location of the mobile device. Infrared (IR) sensor data, such as infrared images, may be received from one or more sensors within the known environment. While performing the CPU and/or GPU operation to generate and display the virtual objects, the mobile device 125 may generate heat that may be detected by the IR sensors. Using the data from the IR sensors, the server 107 may be able to determine an approximate location of the mobile device 125. For example, there may be multiple IR sensors within a given known environment (e.g., each room in a multi-room home may have its own infrared sensor). An IR sensor in a particular location may detect a heat being generated from a heat source (e.g., the mobile device 125), while other sensors may not detect heat. Alternatively, one IR sensor may detect a heat that is significantly larger than the heat detected by the other IR sensors. Based upon the received IR sensor data (e.g., determining a location of the source of heat), the server 107 may establish an approximate location of the mobile device 125 within the known environment.

The mobile device 125 may also be instructed to actively generate heat for detection by the IR sensors. For example, the server 107 may transmit instructions to the mobile device 125, to cause the mobile device 125 to begin performing processes that may generate heat (e.g., by running a processor to perform many computations). These instructions may include rapid and complex mathematical operations more likely to cause the chips in the mobile device 125 to heat faster. The mobile device 125 may execute the instructions until a certain temperature is reached (e.g., to avoid heat damage to the mobile device 125) and/or until the battery reaches a threshold level (e.g., stopping if the battery level drops to 70%). After transmitting these instructions, the server 107 may receive heat measured by the one or more sensors. The server 107 may establish the approximate location of the mobile device 125 based upon the heat data measured by the one or more sensors. For instance, the mobile device 125 may be close to a sensor that measured significantly more heat than the other sensors.

The active generation of heat may be associated with a plurality of thermal signatures (e.g., a heat pattern) that may be used to determine the approximate location. The mobile device 125 may be instructed to perform a certain sequence of CPU and GPU operations, which may generate a particular thermal signature. For example, the server 107 may provide the mobile device 125 with instructions to render particular three-dimensional objects in the digital overlay. Certain portions of the objects such as textures, level of detail, materials may be available locally at the mobile device 125. When the GPU renders these objects, the rendering may generate a particular thermal signature that can be detected by one or more IR sensors. The thermal signature may be used in combination with detecting a pattern of RF emissions detected by the gateway device 111. The thermal signature may be correlated with the pattern of RF emissions, and the server 107 may utilize the thermal signature and the pattern of RF emission to determine an approximate location of the mobile device 125.

Another way of approximating the location may use infrared (IR) sensors. In step 310, a determination may be made as to whether one or more nearby motion detectors are available. If one or more nearby motion detectors are available in step 310, the process may perform step 311. If one or more nearby motion detectors are not available, step 312 may be performed without performing step 311.

In step 311, motion detector data may be used to determine, refine, and/or verify approximate location of the mobile device. The server 107 may receive motion detection data from the one or more motion detectors and determine which motion detector has detected a movement. The detected movement may be caused by a user moving with the mobile device 125. An approximate location of the mobile device 125 may be determined based on the location of the motion detector that may have detected a movement. The user may also be prompted to move, e.g., through a message in the display of the mobile device 125, which may be captured by a motion detector. This active movement captured by the motion detector may be used to determine the approximate location of the mobile device 125. Similarly, if the server 107 is aware that the mobile device 125 is in motion (e.g., the current image is part of moving video, or a sequence of images at a rate above a threshold indicating movement), then the server 107 may use the absence of motion to also refine its approximate location determination. If the mobile device 125 is in motion, but no movement is detected by a living room motion detector, then the living room may be eliminated from the approximate location.

Other sensors (or devices) may be used for approximating the location of the mobile device 125. In step 312, a determination may be made as to whether any other sensors/devices are available. If there are any other sensors, the process may proceed to step 313. If other sensors/devices are not available, the process may proceed to step 314 without executing step 313.

In step 313, other sensor data may be used to determine, refine, and/or verify the approximate location of the mobile device. The other sensors may be, for example, antennas of other electronic devices within the known environment. These antennas may be RF antennas, Bluetooth antennas, and/or any other type of antennas. The signals from the mobile device 125 received from the antennas may be used for triangulation to determine the approximate location of the mobile device 125. Other examples, of sensors include weight sensors detecting a presence of an object (e.g., a person) at a location, light sensor (light being on when a person is present in a room), and/or any other type of sensors. These other sensors may be used to determine the approximate location of the mobile device 125.

Other devices may include lighting devices that may manipulate the ambient environment of the mobile device 125. For example, the server 107 may communicate with a lighting device (e.g., an ambient light or a spotlight) and instruct the lighting equipment to modulate the light being emitted. The modulation may include, for example, changing the intensity and/or color of light at different frequencies and amplitudes. The modulation may begin before receiving the relocalization request when the AR session is established between the mobile device 125 and the server 107. This modulation may be at a frequency that is imperceptible (or invisible) to humans but that may be detectable by the camera of the mobile device 125.

The light modulation may affect the image captured by the mobile device 125. The light modulation may impart a texture on the image that can be detected locally by the mobile device 125 and/or by the server 107. This effect may be used to determine the approximate location of the mobile device 125. For example, there may be lighting devices at multiple rooms in the user's home and the server may cause different modulations for corresponding lighting devices. If the image captured by the mobile device has an effect of a particular modulation, for example, modulation of the light in the living room, the server 107 may establish the approximate location of the mobile device 125 to be the living room. The server 107 may also instruct the mobile device 125 to capture additional images if the modulation generates different time varying (or continuously changing) light patterns. The server 107 may determine the approximate location of the mobile device 125 based upon the effect of the sequence of the time varying light patterns.

In step 314, a subset of the data set may be selected based on the approximate location of the mobile device, as determined based on data received from one or more sensors. Each of the various sensors used above (e.g., steps 305, 307, 309, 311, 313) may yield an approximate location that identifies a portion of the data set, and the various approximate locations may be combined, or intersected, to result in a refined approximate location. The process may cycle through multiple available sensors to determine, refine, and/or verify the approximate location of the mobile device and select the subset of the data set based on the approximated location. For example, the server 107 may determine, based on the gateway data that the signal from the mobile device 125 arrive from the east side (comprising a front lawn, living room, kitchen, and dining room) of the user's home (e.g., as shown in FIG. 4B). Locations (and the features) from the west side of the house (e.g., shaded regions in FIG. 4B) may be eliminated based on the wireless signal directionality. A surveillance camera may have detected a humanoid object in the kitchen and dining room of the house (e.g., as shown in FIG. 4C), resulting in an approximate location in those areas of the house. Features from other areas, such as the front lawn and the living room, may be eliminated based on this detection (e.g., additional shaded regions as shown in FIG. 4C). The server 107 may determine that the IR sensor in the dining room has detected a heat source and/or a thermal pattern (e.g., as shown in FIG. 4D). Based on this determination, features from the kitchen (e.g., additional shaded region as shown in FIG. 4D) may be eliminated. By combining the results from these various sensors (e.g., by looking for overlap in their respective approximate locations) the approximate location of the mobile device may be determined to be the dining room. The feature pointcloud for the dining room may be selected as the subset for further processing, and this subset may include the coordinates for features in the dining room (e.g., a dining room table) but not other areas of the house. In combining the various results of the sensors, it may be determined that some sensors do not agree or overlap in their respective results (e.g., a camera may conclude that the user is in the dining room, while a motion detector may conclude that the user is not in the dining room). The combination may take these different results into account, and may select results that are agreed upon by a majority of sensors to approximate the location. For example, the server 107 determine based upon multiple sensors that the user is in the dining room, and may reject from determination from the single sensor data that the user may be elsewhere, based on more sensors indicating the dining room as an approximate location.

In step 315, the subset may be compared to the features that were detected in the image captured by the mobile device, to find a match. For example, the server 107 may compare the received combination of features with multiple combinations of features in the subset of the data set.

In step 316, a determination may be made as to whether the mobile device 125 was relocalized based upon the comparison in step 315. The mobile device may be relocalized if there is a match between the combination of received features with a combination of features in the subset of the data set. For example, if the server 107 determines that the northern corner of the kitchen was found to be in the image from the mobile device 125, shown from the perspective of the center of the family room, then the mobile device 125 may be determined to have been in the center of the family room at the time the image was captured.

In step 318, the mobile device 125 may be caused to update its XR display if the mobile device 125 is relocalized in step 316. For example, the server 107 may transmit the updated location to the mobile device 125. The mobile device 125 may use the updated location to update the rendering of one or more XR objects in the display. For example, even when the user is moving, an XR object may be displayed based on an old (or invalid) location of the mobile device 125. The mobile device 125 may use the updated location to refresh how or where the XR object is rendered. If the user is moving closer to the XR object, the mobile device 125 may refresh the rendering to increase the size of the XR object or show additional detail. If the user is tilting the mobile device, the mobile device 125 may refresh the rendering of the XR object to show a different perspective.

The relocalization loop (step 302-316) may be again be started for another relocalization request. However, if there is no match—no features in the subset are found in the image from the mobile device, the user may be prompted for additional information from the user in step 317 to restart the relocalization loop. The additional information may include, for example, a new set of features from a new photo taken by the user, identification of the approximate location by the user (e.g., "I am in the dining room."), and/or any other information that may be used to determine the approximate location and/or relocalize the mobile device. The relocalization loop may be continuously executed until the XR session is ended.

Although the above method 300 is described in terms of steps being performed at the server 107 side, the steps of the method 300 may be performed at the client side additionally and/or alternatively. The mobile device 125 may perform the above steps as well. For example, the mobile device 125 may receive the data set of a known environment from the server and perform all the steps of the method 300 to generate the subset of the data set and relocalize itself by comparing the subset of the data set with features extracted from an image. The mobile device 125 may communicate with the sensors directly or through one or more servers.

Figure 4A:
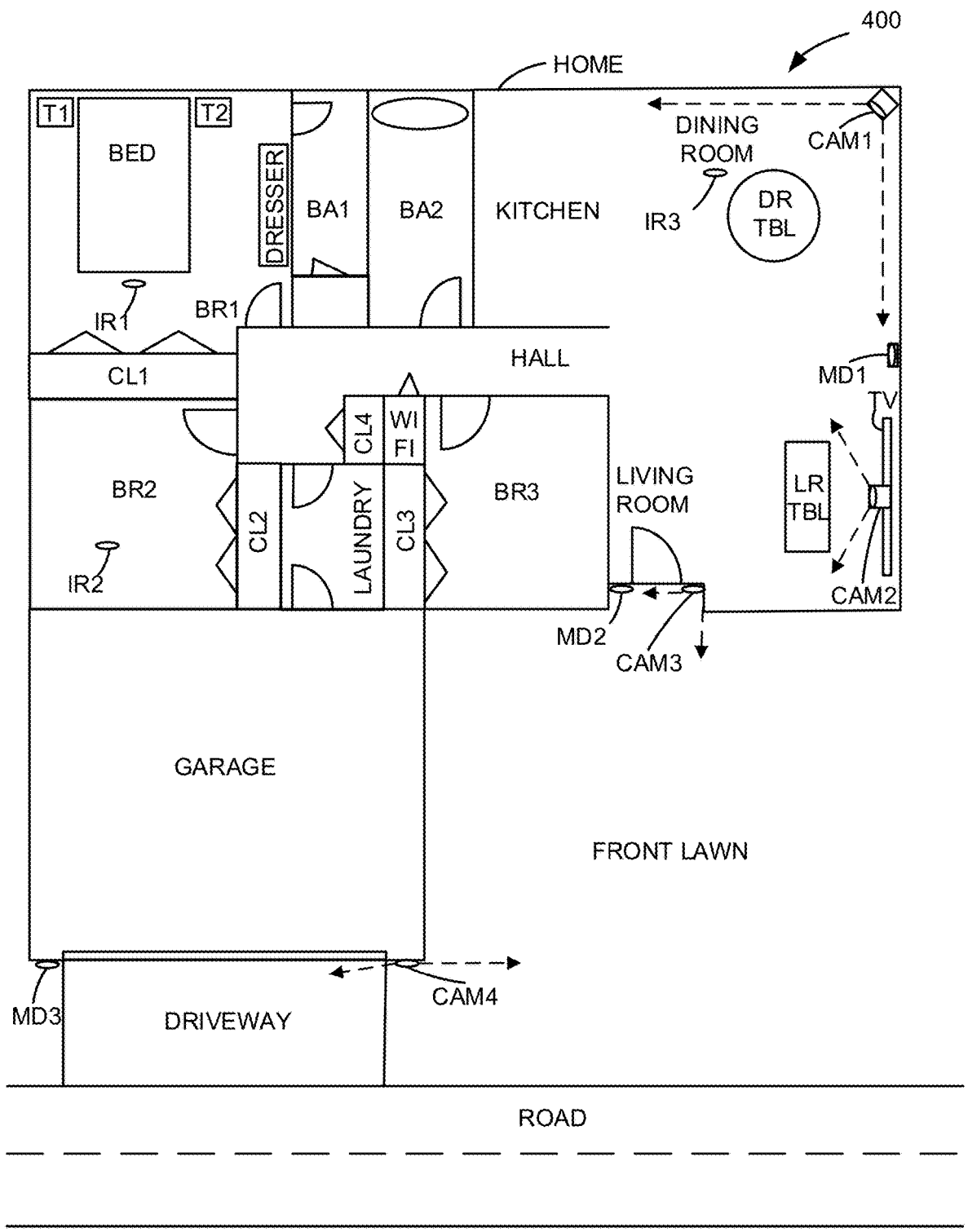
FIGS. 4A-4D show examples of generating subset of a data set based on an approximate location of a mobile device.
Figure 4B:
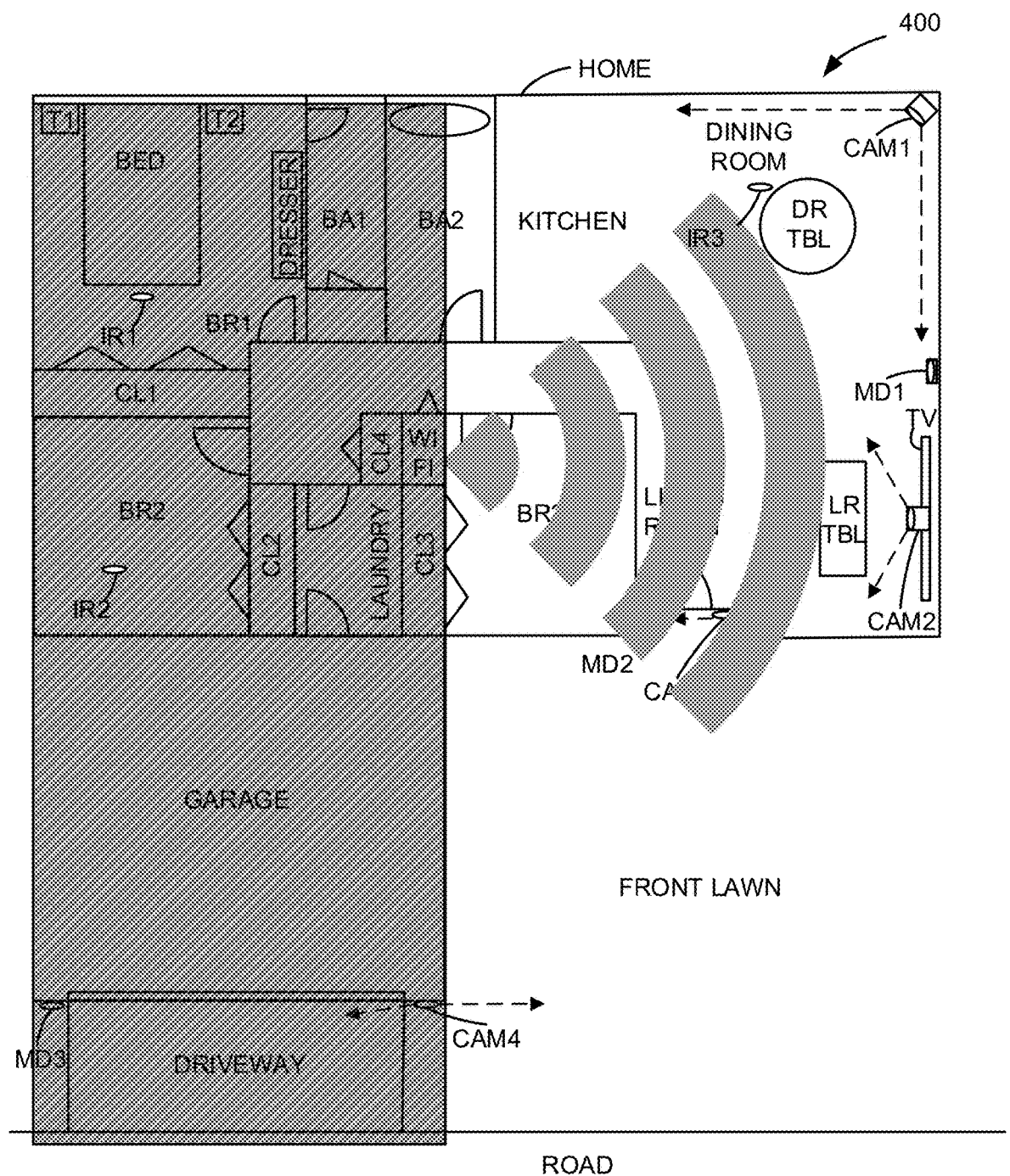
Figure 4C:
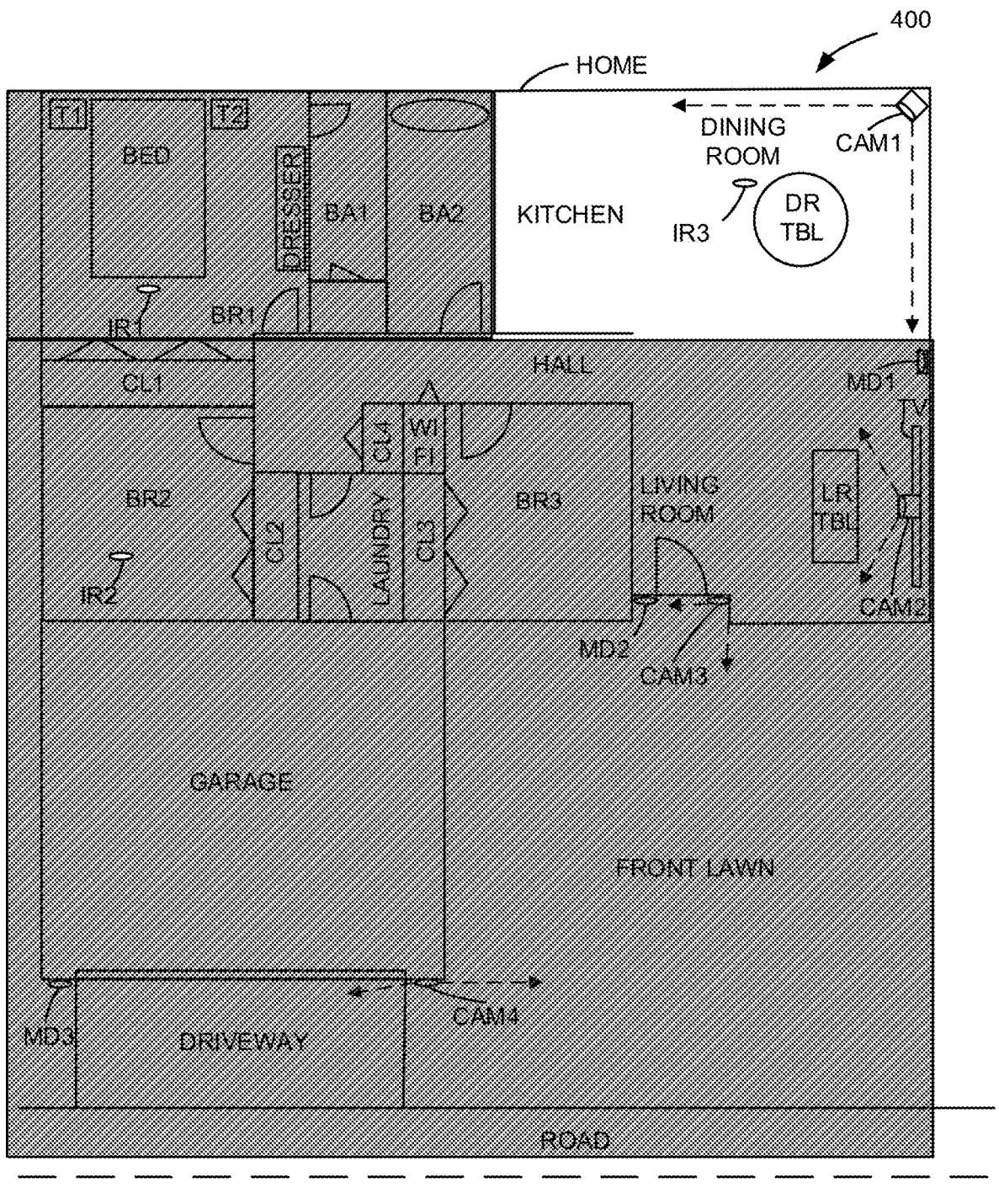
Figure 4D:
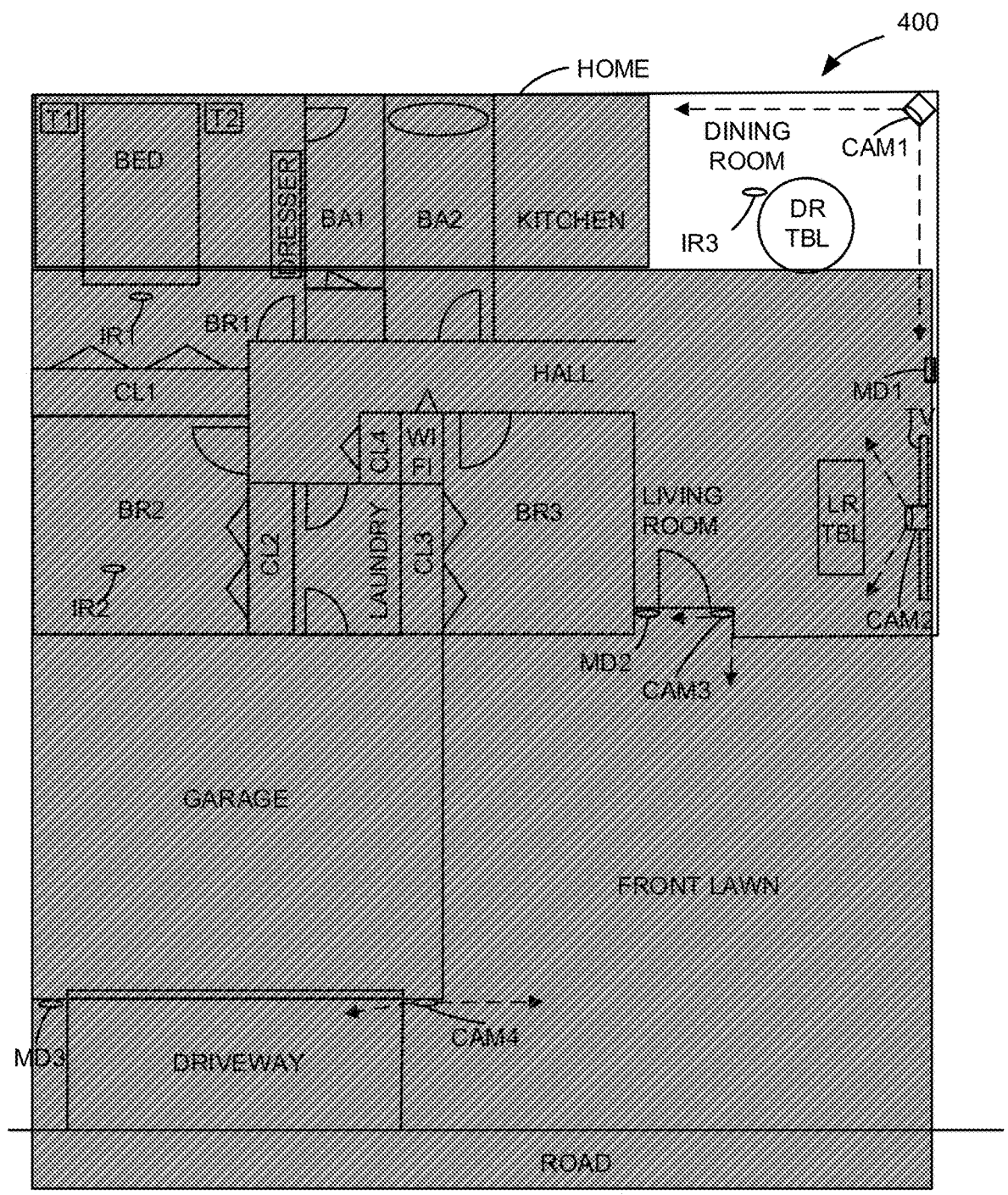

FIG. 4A shows an example of a known environment 400 in which a mobile device (e.g., mobile device 125 in FIG. 1) may have to be localized. As shown, the known environment 400 may be a user's home with sensors located at different areas. The home may include a garage, a living room, a dining room, a kitchen, a hall, a master bedroom BR1, a second bedroom BR2, a third bedroom BR3, a master bathroom BA1, a second bathroom BA2, a master closet CL1, a second bedroom closet CL2, a third bedroom closet CL3, a laundry room connecting the garage to the hall, and a hall closet CL4. The living room may include a living room table LR TBL and a TV. The dining room may include a dining room table DR TBL. The master bedroom BR1 may include a bed, a dresser, and night stands T1 and T2 on either side of the bed. A dataset, such as a feature pointcloud of the known environment 400 may include each of these locations and the objects within the corresponding locations.

A plurality of sensors may be within the known environment 400. As shown the known environment 400 may have sensors such as cameras CAM1, CAM2, CAM3, and CAM4; motion detectors MD1, MD2, and MD3; gateway device WIFI; and infrared sensors IR1, IR2, and IR3. The cameras CAM1, CAM2, CAM3, or CAM4 may capture video and/or still images. The motion detectors MD1, MD2, and MD3 may detect motion within their respective fields. The gateway device WIFI may allow device within the home to connect to a wide area network (WAN) such as the Internet. The infrared sensors IR1, IR2, and IR3 may detect heat within their respective fields.

A server (e.g., the application server 107 in FIG. 1) may maintain a database of features associated (e.g., the dataset, such as the feature pointcloud) with the known environment 400. Relocalization of a mobile device within this known environment 400 may include comparing features being observed by the mobile device with the database. Comparing the features being observed with the entire database may be computationally expensive, and the server 107 may utilize data from one or more of the sensors to generate a subset of the data set to relocalize the mobile device 125.

FIG. 4B shows an example of determining an approximate location of the mobile device 125 and generating a subset of the data set based upon gateway data. The server 107 may determine that the gateway WIFI is receiving signals of the mobile device from the east side of the home and establish the approximate location of the mobile device to be on the east side of the home. Based on this approximate location, the server may generate the subset of data set containing the features on the east side of the home.

FIG. 4C shows an example of determining an approximate location of the mobile device 125 and generating a subset of the data set based upon camera data. In FIG. 4C, the server may determine that camera CAM1 may be observing a person, while cameras CAM2, CAM3, and CAM4 may not be observing any person. Based on this determination, the server 125 may establish the approximate location of the mobile device to be in the kitchen-dining room area. The server may generate a subset of the data set comprising the features associated with the kitchen-dining room area while eliminating features not associated with the kitchen-dining room area. As shown, the shaded portion in FIG. 4C represents the location from which features eliminated to generate the comparison set.

FIG. 4D shows an example of determining an approximate location of the mobile device 125 and generating a subset of the data set based on the IR sensor data. The server 107 may determine that the IR sensor IR3 may be detecting a thermal pattern in the dining room while other IR sensors IR1 and IR2 may not be detecting heat and/or a thermal pattern. Based on this determination, the server 107 may establish an approximate location to be in dining room. Based on this approximate location, the server 107 may generate the subset of the data set containing the features in the dining room.

The iterative approximation of location and the generation of the subset of the data set in FIGS. 4A-4D are shown as examples. The approximated locations need not overlap, and the server 107 may determine the approximate location based on data from a majority of sensors while eliminating inconsistent data from other sensors. For example, while WIFI, CAM1, and IR3 may indicate the approximate location of the mobile device 125 in the dining room, a motion detector in the dining room need not necessarily detect a motion in the dining room. The server 107 may eliminate the inconsistent data from the motion detector when the location of the mobile device 125 is approximated.

Figure 5:
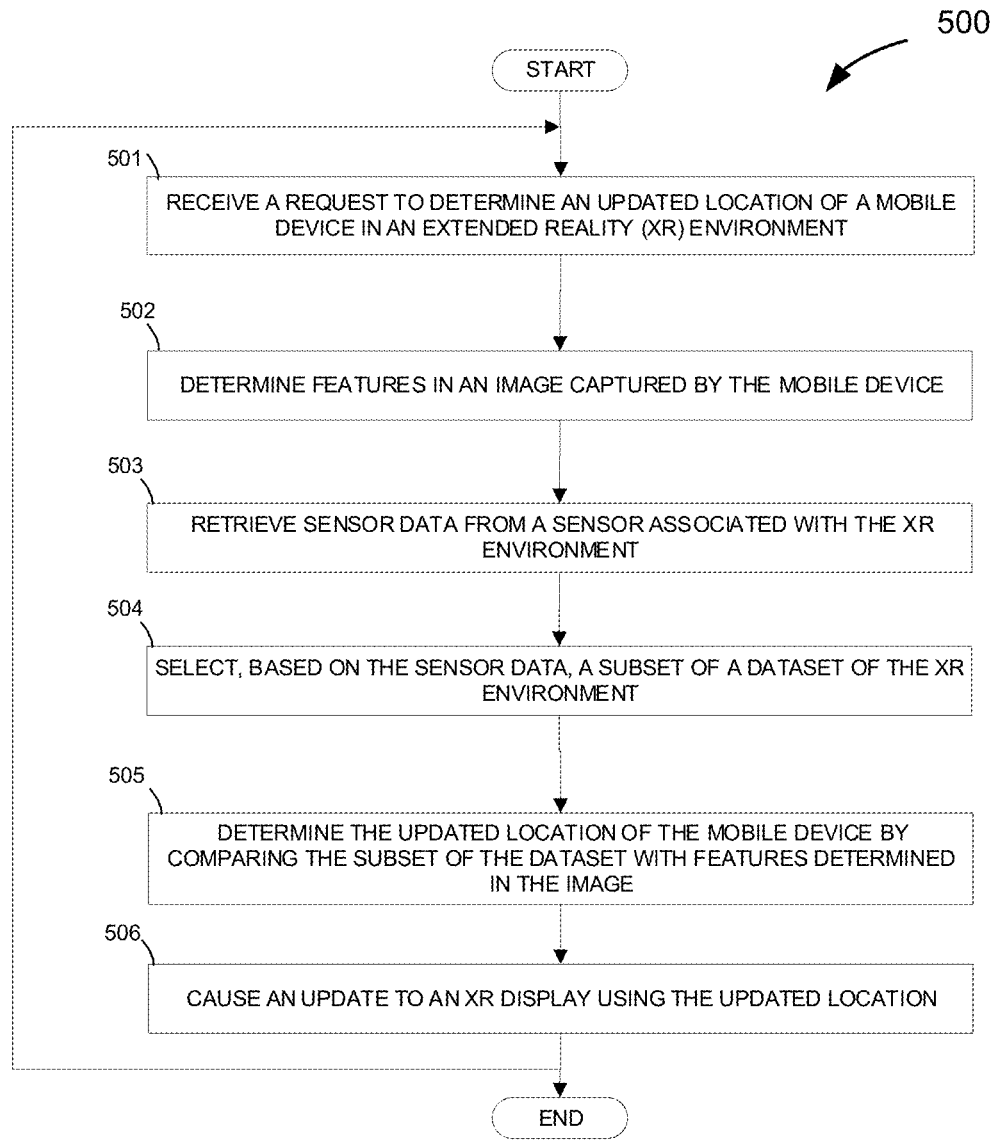
FIG. 5 shows a flow chart of an example method of relocalizing a mobile device.

FIG. 5 is a flow chart showing an example method 500 for localizing and/or relocalizing (e.g., determining and/or updating position and orientation) a mobile device (e.g., an XR headset having integrated cameras). The steps of the method 500 may be performed by a server such as the application server 107 and a mobile device 125, as shown in FIG. 1. The server 107 and the mobile device 125 are just example computing devices that may perform the steps of the method 500, and any type or configuration of computing devices should be considered within the scope of this disclosure. The server 107 that performs the method 500 may provide XR services to the mobile device 125. More particularly, the server 107 may perform the method 500 to determine and update locations (e.g., position and orientation) of the mobile device 125 such that virtual objects are digitally overlaid at appropriate positions and orientations within a view of the real world from the mobile device 125.

In step 501, a request to determine an updated location of a mobile device in an XR environment may be received. Step 501 may be performed, for example, as described above with respect to step 302 of the method 300. For example, the server 107 may receive a relocalization request transmitted by the mobile device 125. The mobile device 125 may transmit this request when the mobile device 125 may have difficulty determining its own position and orientation with respect to a frame of reference, and/or on a continuous basis throughout a duration of an XR experience (e.g., if the mobile device 125 simply lets the server 107 handle all the relocalization calculations).

In step 502, features in an image captured by the mobile device may be determined. Step 502 may be performed, for example, as described above with respect to step 303 of the method 300. The mobile device 125 may transmit the captured image to the server 107, and the server 107 may process the image to determine features in the image (e.g., walls, corners, surfaces). Alternatively, the mobile device 125 may process the image to determine the features and transmit the determined features to the server. The feature determination may also be a combination of local processing (e.g., the mobile device 125 determining relatively simple features such as edges, spheres, corners, etc.) and server processing (e.g., the server 107 determining relatively complex features such as complex shapes with a combination of different edges, faces, etc.).

At step 503, sensor data from a sensor associated with the XR environment may be retrieved. Step 503 may be performed, for example, as described above with respect to steps 304-313 of method 300. For example, the server 107 may communicate with one or more sensors that may be in the vicinity of the mobile device. The sensors may include, for example, surveillance cameras, motion detectors, IR sensors, network gateways, and/or any other type of sensor. A video or a series of images can be retrieved from the surveillance cameras. Motion detection data indicating whether a motion detection has detected a motion in its vicinity may be retrieved from the motion detectors. The IR sensor data retrieved from the IR sensors may indicate corresponding heat signatures in the vicinity of the IR sensors. Network gateways may indicate, based on beamforming analyses, the direction of the signals they have received. The network gateways may also indicate which network gateway of multiple network gateways has received the signals containing the relocalization request.

In step 504, a subset of a data set (e.g., a feature pointcloud) of the XR environment may be selected based on the sensor data. Step 504 may, for example, comprise the details described above with respect to step 314 of method 300. This selection may be based on an approximated location of the mobile 125 using the sensor data. For example, data retrieved from a surveillance camera may indicate presence of a humanoid object at a particular portion of a house. This presence (an example of an approximate location) may be used to select a subset of the dataset associated with the particular portion of the house while eliminating other elements in the dataset not associated with the particular portion of the house. Some examples of such selections based on data retrieved from different types of sensors are shown in FIGS. 4A-4D.

In step 505, the updated location of the mobile device may be determined by comparing the subset of the dataset with features determined from the image. Step 505 may, for example, comprise the details described above with respect to step 315 of method 300. For example, the server 107 may compare a combination of features in the image with the subset of features in the data set to find a match. Finding such match may indicate that the mobile device 125 may have relocalized (e.g., the server may have determined the position and the orientation of the mobile device based on the features the mobile device may have captured).

In step 506, an update to an XR display is caused using the updated location. Step 506 may, for example, comprise the details described above with respect to step 318 of method 300. For example, the server 107 may transmit the updated location to the mobile device 125. Step 505, The mobile device may use the updated location to update the rendering of one or more XR objects in its display. For example, even when the user is moving, an XR object may still be displayed based on an old (or invalid) location of the mobile device 125. The mobile device 125 may use the updated location to refresh how or whether the XR object is rendered. If the user is moving closer to the XR object, the mobile device 125 may refresh the rendering to increase the size of the XR object or show additional detail. If the user is tilting the mobile device 125, the mobile device 125 may refresh the rendering of the XR object to show a different perspective.

As shown, the steps 501-506 of the method 500 may be continuously performed in loop until the user exits the XR environment. In other words, the mobile device 125 may generally be in motion and therefore may have to be relocalized multiple times during an active XR session.

Although examples are described above, features and/or steps of those examples may be combined, divided, omitted, rearranged, revised, and/or augmented in any desired manner. Various alterations, modifications, and improvements will readily occur to those skilled in art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   receiving, by a computing device, a request to determine an updated location of a headset in an extended reality (XR) environment;
   determining features in an image captured by the headset;
   retrieving an image captured by an image sensor associated with the XR environment;
   retrieving, via one or more infrared sensors associated with the XR environment, a thermal signature corresponding to the headset;
   selecting, based on a distortion in the image captured by the sensor, and based on the thermal signature, a subset of a data set of the XR environment, wherein the distortion is based on an interference within the image captured by the image sensor;
   determining the updated location of the headset by comparing the selected subset of the data set with the features determined in the image captured by the headset; and
   causing an update to an XR display using the updated location.

2. The method of claim 1, wherein selecting the subset of the data set is further based on:
   recognizing a body of a user in the image captured by the image sensor; and
   not recognizing a face of the user in the image captured by the image sensor.

3. The method of claim 1, wherein selecting the subset of the data set is further based on detection of an emission that has interfered with capturing the image by the image sensor.

4. The method of claim 1, wherein selecting the subset of the data set is further based on:
   causing the headset to emit light; and
   detecting the emitted light in the image captured by the image sensor.

5. The method of claim 1, wherein selecting the subset of the data set is further based on:
   prompting a user of the headset to perform a physical action; and
   detecting the physical action in the image captured by the image sensor.

6. The method of claim 1, wherein the thermal signature corresponds to heat output by the headset.

7. The method of claim 1, wherein selecting the subset of the data set further comprises:
   causing the headset to perform processes that cause it to emit heat corresponding to the thermal signature; and
   detecting, via the one or more infrared sensors the thermal signature.

8. The method of claim 1, wherein the selecting the subset of the data set is further based on:
   detecting a motion based on the image captured by the image sensor.

9. The method of claim 1, wherein the selecting the subset of the data set further comprises:
determining a direction of a signal received from the headset by a wireless antenna array.

10. The method of claim 1, wherein selecting the subset of the data set is further based on:
a triangulation operation utilizing a signal received by an antenna and from the headset.

11. The method of claim 1, wherein the determining features in the image captured by the headset further comprises:
receiving information identifying the features.

12. The method of claim 1, wherein the XR environment comprises at least one of a virtual reality (VR) environment or an augmented reality (AR) environment.

13. The method of claim 1, further comprising:
receiving, from a gateway, information indicating the headset has changed gateways, and wherein the selecting the subset of the data set is further based on the information.

14. The method of claim 1, further comprising:
causing a light source to change a color of light being emitted; and
selecting the subset of the data set is based on detecting an effect of the change of the color of the light on the image captured by the image sensor.

15. The method of claim 1, wherein the subset of the data set of the XR environment comprises a portion of image data corresponding to a source of the distortion.

16. The method of claim 1, wherein the headset is associated with a source of the distortion, and wherein an approximate geographic location of the headset comprises an approximate location of the source of the distortion.

17. The method of claim 1, wherein the comparing further comprises:
relocalizing the headset by matching the features determined in the image captured by the headset with the selected subset of the data set.

18. A method comprising:
receiving, by a computing device, a request to determine an updated location of a mobile device in an extended reality (XR) environment;
receiving, via one or more infrared (IR) sensors, a pattern of thermal emissions;
receiving an image captured by the mobile device;
determining a location of the mobile device based on the pattern of the thermal emissions correlating to a pattern of radio frequency (RF) emissions detected by a gateway device;
removing features from a feature point cloud, based on the location, to generate a subset of a data set;
determining an updated location of the mobile device by comparing the subset of the data set with features in the image; and
causing an update to an XR display using the updated location.

19. The method of claim 18, wherein the determining the location of the mobile device is further based on a location of the one or more IR sensors.

20. A method comprising:
receiving, from a headset, a data set of an extended reality (XR) environment;
determining features in a captured image of the headset;
receiving, from a plurality of gateways, information:
indicating a direction from which first signals of the headset are received by the plurality of gateways; and
identifying a gateway of the plurality of gateways that received second signals comprising a request for an updated location from the headset;
selecting, based on the received information, a subset of the data set;
determining an updated location of the headset by comparing the subset of the data set with the features in the captured image of the headset; and
updating an XR display using the updated location.

21. The method of claim 20, wherein selecting the subset of the data set further comprises:
causing the headset to emit light; and
detecting the emitted light in a field of view of a camera.

22. The method of claim 20, wherein determining the updated location of the headset is further based on:
performing a plurality of operations to emit a thermal signature;
detecting a pattern of radio frequency (RF) emissions detected by a gateway device; and
correlating the thermal signature with the pattern of RF emissions.

* * * * *